United States Patent [19]
Edelman

[11] 4,322,611
[45] Mar. 30, 1982

[54] METHOD AND APPARATUS FOR DETECTING AND INDICATING DATA

[76] Inventor: Alan Edelman, 230 E. Walnut Park Dr., Philadelphia, Pa. 19120

[21] Appl. No.: 198,924

[22] Filed: Oct. 20, 1980

Related U.S. Application Data

[63] Continuation-in-part of Ser. No. 60,670, Jul. 25, 1979, abandoned.

[51] Int. Cl.[3] .................. G06K 15/00

[52] U.S. Cl. .................. 235/383; 340/825.3; 340/825.75; 235/92 FQ

[58] Field of Search .................. 235/378, 383, 92 FQ, 235/92 V; 340/171 R, 171 PF, 147 A; 364/464

[56] References Cited

U.S. PATENT DOCUMENTS

| | | | |
|---|---|---|---|
| 3,082,402 | 3/1963 | Scantlin | 340/152 |
| 3,111,576 | 11/1963 | Lipschutz | 235/61.11 |
| 3,248,700 | 4/1966 | Sinn | 340/152 |
| 3,283,304 | 11/1966 | Sinn et al. | 340/152 |
| 3,366,945 | 1/1968 | Bowman | 340/324 |
| 3,601,805 | 8/1971 | Snook | 340/149 |
| 3,611,294 | 10/1971 | O'Neill | 340/152 |
| 3,716,835 | 2/1973 | Weinberg et al. | 340/154 |
| 3,806,705 | 4/1974 | Reilly et al. | 235/61.9 R |
| 3,826,900 | 7/1974 | Moellering | 235/61.11 E |
| 4,002,886 | 1/1977 | Sundelin | 340/147 A |
| 4,139,149 | 2/1979 | Crepeau et al. | 235/383 |
| 4,237,537 | 12/1980 | Pitches et al. | 364/464 |

*Primary Examiner*—Donald J. Yusko
*Attorney, Agent, or Firm*—John C. Dorfman

[57] ABSTRACT

An apparatus and method for detecting and indicating unknown data associated with a selected article having a unique identification code employs a plurality of stored data tones. The data tones are stored in numeric order, each tone having a frequency corresponding to the data associated with an article having an article identification code corresponding to the sequential number of the data tone. The data tones are temporarily stored and counted up to the number of the selected article identification code whereupon the frequency of the corresponding data tone is displayed.

9 Claims, 3 Drawing Figures

METHOD AND APPARATUS FOR DETECTING AND INDICATING DATA

CROSS REFERENCE TO RELATED APPLICATION

This is a continuation-in-part of Ser. No. 60,670 filed July 25, 1979 and entitled "Apparatus for Detecting and Indicating Data", now abandoned.

BACKGROUND OF THE INVENTION

1. Field of the Invention

This invention relates generally to data retrieval and, more particularly, to an apparatus for detecting and indicating unknown data associated with a selected article having a unique numeric identification code.

2. Description of the Prior Art

In our increasingly complex society, it is often desirable to have the ability to instantly and conveniently retrieve unknown information and data associated with a particular article. For example, in a supermarket or any other store in which there is a large number of various articles for sale, it is desirable for a cashier or a stock clerk to be able to conveniently obtain the correct price of a particular article which does not have the price marked on it. Since the price of a given article may change from time to time, for example due to short term special sales or changes in inventory costs, it is desirable to be able to obtain the current selling price of the article. It is also desirable to be able to obtain the price of the particular article at a system cost which is reasonable. The present invention provides an apparatus for quickly, accurately and inexpensively determining and indicating unknown data, for example pricing data, associated with a selected article.

SUMMARY OF THE INVENTION

Briefly stated, the present invention provides a method and apparatus for detecting and indicating unknown data, for example pricing data, associated with a selected article which has a unique numeric article identification code. The unknown data is stored as a plurality of data tones sequentially arranged in numeric order with each data tone having a frequency determined by the data associated with an article having a numeric identification code corresponding to the number of the data tone. Each data tone in the sequence is preceded by an incrementing tone of a first predetermined frequency. An encoder means is provided for generating a signal representative of the identification code of the selected article which is transmitted to a comparator means. A tone decoder means is provided for receiving the incrementing codes and generating incrementing signals in response thereto which are transmitted to a counter means. The counter means receives and counts the incrementing signals and generates a signal representative of the count which is transmitted to the comparator means. The comparator means compares the two received signals and generates an output enabling signal only when the two compared signals are the same. A frequency counter means is provided for receiving the data tones and for generating a display signal representative of the frequency of the received data tone when the comparator means identifies the compared signals as being the same. A display means is provided for receiving the display signal from the frequency counter means and displaying the data associated with the selected article.

BRIEF DESCRIPTION OF THE DRAWINGS

The foregoing summary, as well as the following detailed description of a preferred embodiment of the invention, will be better understood when read in conjunction with the appended drawings, in which.

DESCRIPTION OF A PREFERRED EMBODIMENT

Figure 1:
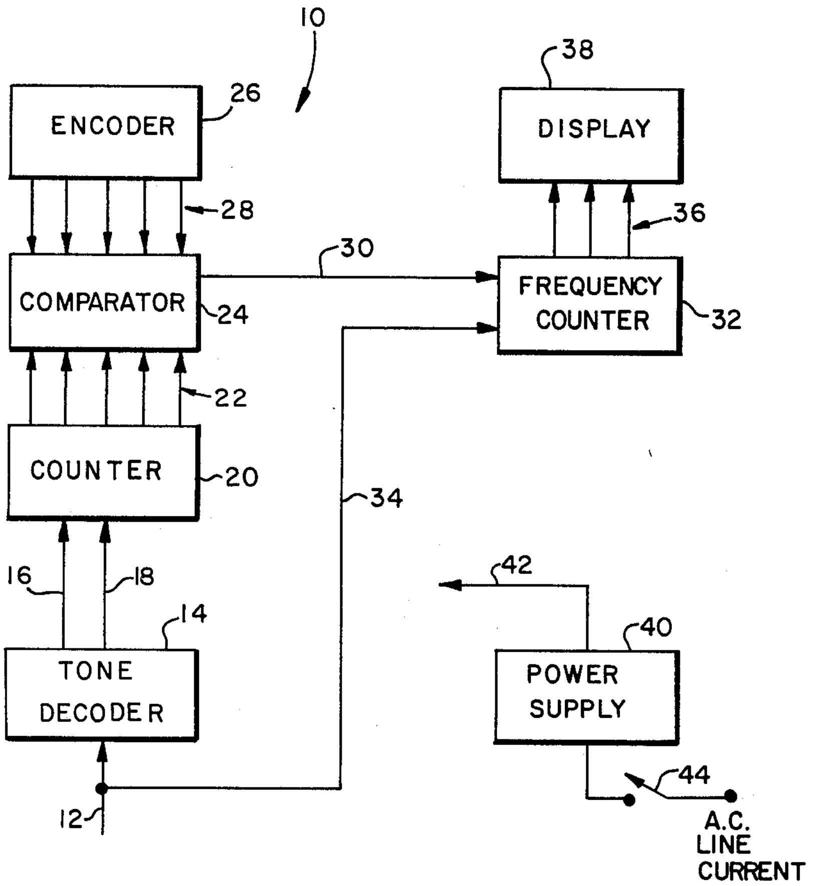
FIG. 1 is a schematic illustration of a general functional block diagram of a preferred embodiment of the present invention.

Referring to the drawings, and particularly FIG. 1, there is shown in accordance with the present invention an apparatus (shown generally as 10) for detecting and indicating the price of a selected article. The apparatus 10 is designed to provide an operator, for example a cashier in a supermarket, with unknown data, for example the price of a particular article, when only a unique numeric identification code associated with the particular article is known. The numeric article identification code could, for example, be located on a label on the article or on the article's container.

While in this embodiment of the present invention, the unique article identification code is limited to a five digit decimal number, this is done only for purposes of clarity, it being understood that the article identification code could be any other suitable length or combination of numbers or the like. Likewise, for purposes of clarity, in this embodiment of the present invention, the indicated data or price of the selected article is presented as a four digit number, it being understood that the price could be any other number of digits suitable for the particular application.

The apparatus 10 receives a plurality of data tones which are sequentially arranged in numeric order. In this embodiment, the data tones are arranged in ascending numeric order beginning with the number one. However, it should be understood that the data tones could also be arranged in any other suitable order, for example descending order beginning at some convenient starting point, for example 5000.

Each of the data tones is at a frequency determined by the data associated with an article having a numeric identification code corresponding to the number of the data tones. For example, the fifth data tone in the sequence contains the data associated with an article having an identification code of five. Thus, if the fifth data tone in the sequence was at a frequency of 129 Hz, the price of the article having an identification code number of five would be $1.29.

The data tones may be prerecorded as a continuously repeating sequential series in a convenient storage means, for example a magnetic tape (not shown). The magnetic tape may be continuously played at a high rate of speed on a magnetic tape player, for example an 8-track player (not shown) which may be conveniently located in the vicinity of the apparatus 10 or may be centrally located to provide data tones to a plurality of remote apparatus 10 at different remote locations utilizing, for example telephone lines or satellite communications techniques (not shown). Other suitable known storage and data transmission methods and devices could alternatively be employed to supply the data tones to the apparatus 10.

In order to keep an accurate count of the data tones, each data tone in the sequence is preceded by a count incrementing tone of a first predetermined frequency which is not likely to be present as a data tone. For example, if the apparatus is being employed in a typical drug or grocery store, it is unlikely that the store will have an item with a price of $10,000. Therefore, the frequency of the incrementing tones could be 10,000 Hz without having any detrimental effect upon the actual data tones. A reset tone of a second predetermined frequency which is also not likely to appear as a data tone is included at the beginning of the tone sequence for initialization of the data tone count.

The apparatus 10 receives the sequence of tones comprising the reset tone, incrementing tones and numerically ordered data tones from a suitable source (described above) along a suitable electrical conductor or input line 12. A tone decoder means 14 is provided to decode the reset and incrementing tones. The tone decoder means 14, which is suitably connected to the input line 12, receives both the reset tone and the incrementing tones and generates respectively, suitable electrical reset and incrementing signals in response thereto. The reset and incrementing signals generated by the tone decoder means 14 are transmitted along suitable lines 16 and 18, respectively, to a counter means 20.

The counter means 20 is provided to count the number of data tones which have been received by the apparatus 10 since the beginning of the tone sequence. To this end, the counter means 20 receives the reset signal from the tone decoder means 14 for initialization purposes. In the present embodiment, the data tones are arranged in ascending order beginning with the number one so the reset signal initializes the count in the counter means 20 at zero. Alternatively, the counter means 20 may be initialized at any other suitable number, for example 5000, to accommodate some other suitable data tone arrangement, for example descending data tones, beginning at the number 5000.

The counter means 20 also receives the incrementing signals from the decoder means 14 and increments or increases the count by one in response to the receipt of each such incrementing signal. In this manner, at any given instant of time, the count contained within the counter means 20 always corresponds to the sequence number of the data tone received by the apparatus 10.

The counter means 20 continuously generates a signal corresponding to the accumulated count which is transmitted along a plurality of lines collectively shown as 22 to a comparator means 24. In the present embodiment, the count signal is conveniently transmitted to the comparator means 24 in the form of a binar coded decimal (BCD) code. However, it should be understood that the use of BCD code is not intended as a limitation on the present invention.

Figure 2:
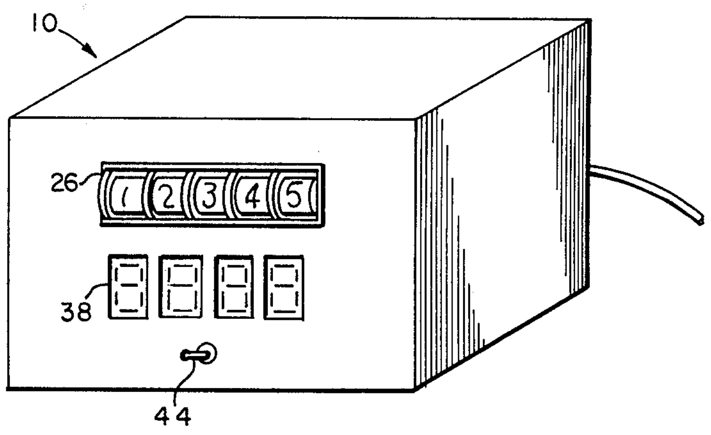
FIG. 2 is a perspective view of the apparatus of FIG. 1.

The apparatus 10 further includes an encoder means 26 which is utilized by an operator as an input mechanism to tell the apparatus 10 the unique numeric identification code of the selected article for which the unknown data or price is desired. The encoder means 26 generates a signal representative of the unique numeric identification code of the selected article which is transmitted, in BCD code, along a plurality of lines, collectively shown as 28, to the comparator means 24. In the present embodiment, the encoder means 26 comprises a five digit thumb wheel unit (see FIG. 2) by which an operator, for example a supermarket cashier, may set the numeric article identification code (shown as the number 12345 in the drawings) of an article whose price is desired to be indicated. The thumb wheel unit is well known by those skilled in the art and a more detailed presentation of its circuitry and operation is not necessary for a complete understanding of the present invention. Suffice it to say that the thumb wheel unit generates a train of digital signals which is a BCD representation of the numeric identification code of the selected article.

The comparator means 24 continuously receives the BCD count signal from the counter means 20 and the BCD selected article identification code signal from the encoder means 26 and continuously compares the two BCD signals with each other (bit by bit). As long as the two compared BCD signals are different, the comparator means 24 merely continues the comparison process. In the event that the comparison identifies the two BCD signals as being the same, indicating that the sequence number of the received data tone is the same as the identification code number of the selected article as set on the encoder means 26 by the operator, the comparator means 24 generates an enabling signal which is transmitted along line 30 to a frequency counter means 32.

The frequency counter means 32 receives the variable frequency data tones over a suitable line 34 and detects the frequency of each received data tone. In the event that the frequency counter means 32 receives an enabling signal from the comparator means 24, indicating that the two compared BCD signals are the same, the frequency counter means 32 generates a display signal representative of the frequency of the corresponding data tone. The display signal is transmitted from the frequency counter means 32, along a plurality of lines, collectively shown as 36, to a display means 38. The display means 38 provides a numerical display of the detected data tone frequency, thereby displaying the unknown data or price associated with the selected article. In the present embodiment, the display means 38 is comprised of four seven-segment light emitting diode (LED) display modules of a type well known by those skilled in the art and which may be purchased commercially as package units. A more detailed description of their circuitry and operation is not necessary for a complete understanding of the present invention.

A suitable power supply 40 is provided to power the above-described components. For purposes of clarity, in the figures, the power supply 40 is not shown as being directly connected to the various components, it being understood that the output lines 42 from the power supply 40 are in actuality connected to all of the places indicated on FIG. 3 with a +V symbol. A switch, for example a toggle switch 44, is provided on the front panel of the apparatus 10 to turn on and off the a.c. power input to the power supply 40.

Figure 3:
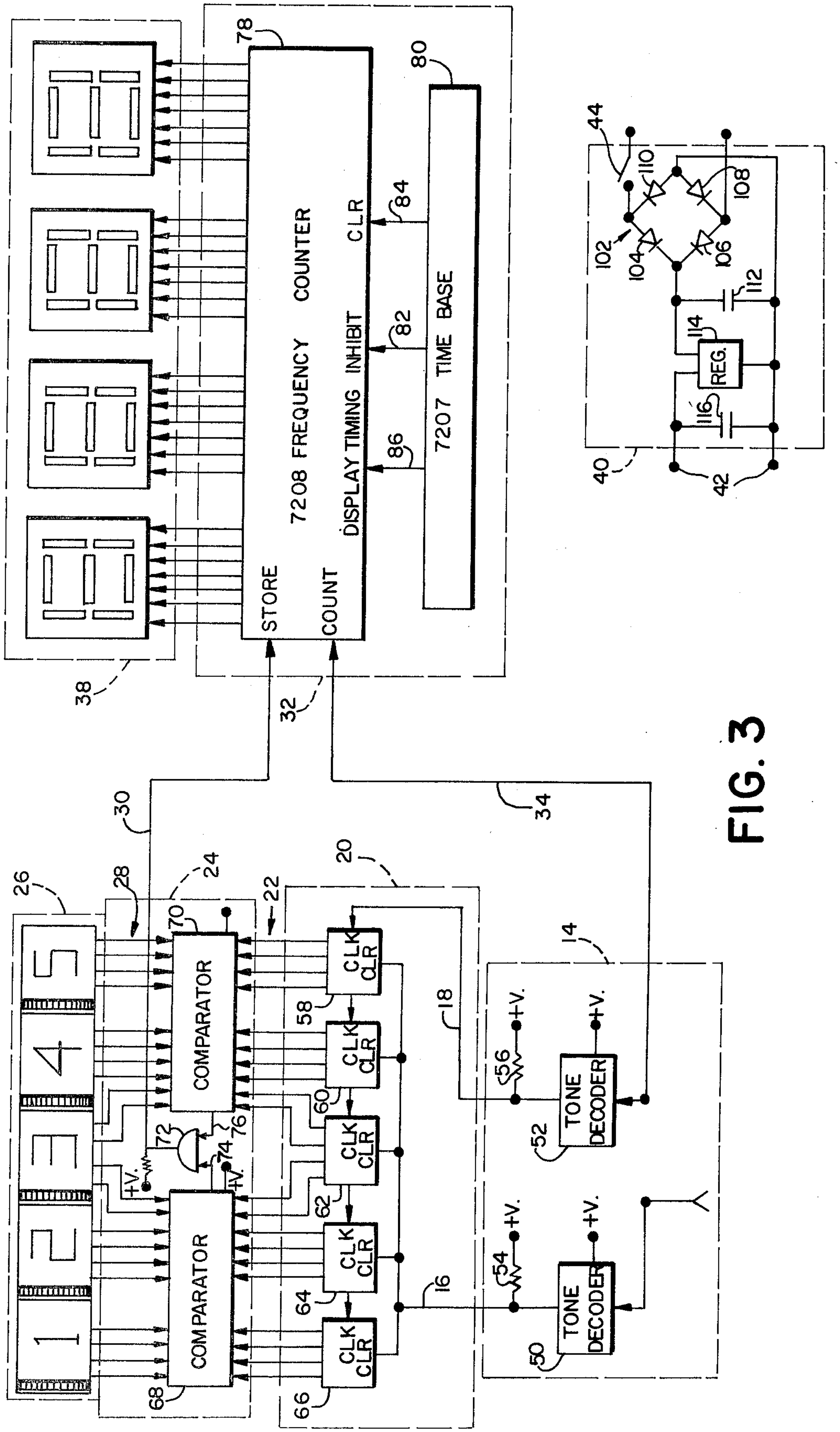
FIG. 3 is a detailed schematic diagram illustrating the electrical circuitry of the major portions of the apparatus of FIG. 1.

Referring now to FIG. 3, there is shown a more detailed schematic circuit diagram of the major portions of FIG. 1. As shown, the tone decoder means 14 is comprised of two individual tone decoders 50 and 52, respectively. The tone decoders 50 and 52 are both of a type well known to those skilled in the art and may be purchased commercially as packaged integrated circuitry, for example, National Semiconductor part number NE 5678. A detailed explanation of the biasing circuitry and operation of the tone decoders 50 and 52 is not necessary for a complete understanding of the present invention, it being generally known and readily available from the manufacturer of the integrated circuits. Suffice it to say that each of the tone decoders 50 and 52 generates a digital output pulse upon the occurrence of an input tone at a specific predetermined frequency. In this embodiment, the digital output pulses generated by the tone decoders are a digital "low" (downward going) pulse, the outputs of each of the tone decoders being normally maintained in a digital "high" state by suitable pull-up resistors 54 and 56, respectively.

The reset tone decoder 50 is set by its biasing to generate an output signal when a reset tone is received at the above-described second predetermined frequency. As discussed above, the output of the reset tone decoder 50 is transmitted along line 16 to initialize the counter means 20 at the beginning of each tone sequence.

The incrementing tone decoder 52 is set by its biasing to generate an output signal when an incrementing tone is received at the above-described first predetermined frequency. The output of the reset tone decoder 52 is transmitted along line 18 to increment the counter means 20 upon the receipt of each incrementing tone.

The counter means 20 comprises five cascade connected decimal counters 58, 60, 62, 64 and 66, which are of a type well known in the art and which may be purchased commercially as packaged integrated circuits, for example, Texas Instrument part Number 74192. A detailed explanation of the biasing, circuitry and operation of the decimal counters is readily available from the manufacturer and is not necessary for a complete understanding of the present invention. Suffice it to say that each time a suitable incrementing signal is received at the clock (CLK) input terminal, the count maintained within the decimal counter is incremented or increased by one. The decimal counters are suitably connected in cascade, a known manner as shown. In this manner, the five decimal counters may accumulate a counter of 99,999.

Line 16 is suitably connected to the clear (CLR) input terminal of each of the decimal counters 58, 60, 62, 64 and 66, as shown. Thus, a reset signal received from the reset tone decoder 50 clears or resets all of the decimal counters to zero.

Line 18 is suitably connected to the CLK input terminal of the first decimal counter 58. Each suitable incrementing signal received from the incrementing tone decoder 52 increases the count in the first decimal counter 58 by one. Once the first decimal counter 58 reaches a count of nine, a subsequent incrementing signal increments the count in the second decimal counter 60 to one and the first decimal counter 58 to zero in the conventional manner. Thus, at any given instant in time the contents of the decimal counters 58, 60, 62, 64 and 66 represents the number of the incrementing tones received since the beginning of the tone sequence. Since each data tone in the tone sequence is preceded by an incrementing tone, the contents of the decimal counters also represents the sequence number of the present data tone in the tone sequence.

The comparator means 24 is comprised of two ten-bit comparators 68 and 70, which are of a type well known in the art and which may be purchased commercially as packaged integrated circuits, for example National Semiconductors part number DM 8130. A detailed explanation of the biasing, circuitry and operation of the comparators 68 and 70 is readily available from the manufacturer and is not necessary for a complete understanding of the present invention. Suffice it to say that each comparator makes a bit by bit comparison between the thumb wheel unit generated, BCD coded, selected article identification signal received along lines 28 with the BCD coded tone count signal received from the decimal counters 58, 60, 62, 64 and 66 along lines 22.

When all twenty BCD code bits received from the thumb wheel unit 26 are the same as the 20 BCD coded bits received from the decimal counters 58, 60, 62, 64 and 66, the comparison is positive and both comparators generate an enabling signal which is transmitted to a two-input AND gate 72 over lines 74 and 76, respectively. The enabling signal passes through AND gate 72 and is transmitted along line 30 to the frequency counter means 32.

The frequency counter means 32 comprises a 7208 frequency counter integrated circuit 78 and a 7207 time base integrated circuit 80 each of which are of a type well known in the art and which may be purchased commercial from the Intersil Company. A detailed explanation of the biasing, circuitry and operation of the 7208 frequency counter 78 and the 7207 time base 80 is readily available from the manufacturer and is not necessary for a complete understanding of the present invention. Suffice it to say that the 7208 frequency counter 78 can detect a received frequency and display the frequency directly utilizing a suitable LED display. The 7207 time base 80 provides timing signals to the 7208 frequency counter 78.

As shown the 7207 time base 80 provides an inhibit signal to the 7208 frequency counter 78 along line 82 to enable the 7208 frequency counter to count the incoming data tones along line 34. The inhibit signal from the 7207 time base may be in the form of a 0.01 second low pulse which is sychronized with the incoming data tones. After each data tone is received and counted by the 7208 frequency counter 78, the 7207 time base 80 transmits a reset pulse along line 84 to clear the 7208 frequency counter 78 for the next incoming data tone. The reset pulse has no effect upon the contents of the LED display means 38. The 7207 time base 80 also provides a 1.6 KHz multiplex scanning signal to the 7207 frequency counter 78 along line 86 to provide timing for the LED display means 38.

As long as the 7208 frequency counter 78 does not receive a signal along line 30, each incoming data tone is detected but is not displayed. In the event that the 7208 frequency counter 78 receives a signal at its store input along line 30, (indicating that the comparison of the BCD signals is positive) the 7208 frequency counter 78 holds the last received data tone frequency and generates a display signal which is transmitted to the LED display means 38 to display the frequency of the data tone.

The power supply 40 includes a full wave rectifier 102 comprised of four suitably connected diodes 104, 106, 108 and 110 and a smoothing capacitor 112. A precision voltage regulator 114 of the type well known in the art and commercially available as a packaged integrated circuit, for example National Semiconductor part number LM 340T-5 and a second smoothing capacitor 116 provide a clean regulated operating voltage, for example positive five volts. It is understood, however, the use of positive five volts is not intended to be limiting and could as well by any other suitable positive or negative voltage.

From the foregoing description, it can be seen that the present invention comprises a method and apparatus for detecting and indicating unknown data associated with an article having a unique numeric identification code. The apparatus is relatively simple in design and economical to produce. It is also extremely simple to operate. It will be recognized by those skilled in the art that changes may be made to the above-described embodiment without departing from the broad inventive concepts of the invention. For example, additional components may be added to increase the capacity of the apparatus to provide for a greater number of article identification codes. It is understood, therefore, that this invention is not limited to the particular embodiment disclosed, but is intended to cover all modifications which are within the spirit and scope of the appended claims.

I claim:

1. An apparatus for detecting and indicating data associated with a selected article having a unique numeric identification code from a plurality of data tones sequentially arranged in numeric order, each data tone being of a frequency determined by the data associated with an article having numeric identification code corresponding to the number of the data tone, each data tone being preceded by an incrementing tone of a first predetermined frequency, the apparatus comprising:

encoder means for generating a signal representative of the idenfication code of the selected article;

tone decoder means for receiving the incrementing tones and generating incrementing signals in response thereto;

counter means for receiving and counting the incrementing signals and for generating a signal representative of the count of the received incrementing signals;

comparator means for comparing the signal from the encoder means with the signal from the counter means;

frequency counter means for receiving the data tones and generating a display signal representative of the frequency of the received data tone when the comparator means identifies the compared signals as being the same; and display means for receiving the display signal from the frequency counter means and displaying the data associated with the selected article.

2. The apparatus as recited in claim 1 wherein the plurality of sequential data tones is preceded by a reset tone of a second predetermined frequency and wherein the tone decoder means receives the reset tone and generates a reset signal, the reset signal being received by the counter means for resetting the sum of the received incrementing signals to zero.

3. The apparatus as recited in claim 2 wherein the data tones are sequentially arranged in ascending numeric order and wherein the signal generated by the counter means is representative of the sum of the received incrementing signals.

4. The apparatus as recited in claim 1 wherein the counter means comprises at least one decimal counter.

5. The apparatus as recited in claim 1 wherein the encoder means comprises at least one thumb wheel encoder which displays different decimal numbers in successive thumb wheel positions and which generates a distinctive binary pulse signal corresponding to each decimal number displayed.

6. The apparatus as recited in claim 1 wherein the frequency counter means comprises a 7208 frequency counter integrated circuit.

7. The apparatus as recited in claim 1 wherein the signal generated by the encoder means and the signal generated by the counter means is in the form of a binary coded decimal pulse train.

8. A method of detecting and indicating data associated with a selected article having a numeric identification code from a plurality of data tones sequentially arranged in numeric order, each data tone being of a frequency determined by the data associated with an article having an identification code corresponding to the number of the data tone, each data tone being preceded by an incrementing tone of a first predetermined frequency, the method comprising:

receiving the incrementing tones and generating incrementing signals in response thereto;

receiving and counting the incrementing signals and generating a signal representative of the count of the received incrementing signals;

generating a signal representative of the identification code of the selected article;

comparing the selected article identification code signal with the signal representative of the count of received incrementing signals;

receiving the data tones and generating a display signal representative of the frequency of a received data tone when the comparison identifies the compared signals as being the same; and receiving the display signal and displaying the data associated with the selected article.

9. The method of claim 8 further including the step of initializing the count of the incrementing signals at zero at the beginning of each sequency of data tones.

* * * * *